United States Patent [19]

Husted et al.

[11] Patent Number: 4,840,775
[45] Date of Patent: Jun. 20, 1989

[54] METHOD FOR REMOVING SODIUM AND CHLORIDE FROM COBALTIC HYDROXIDE

[75] Inventors: Eric F. Husted, Ulster; Judith A. Ladd, Sayre, both of Pa.

[73] Assignee: GTE Products Corporation, Stamford, Conn.

[21] Appl. No.: 107,079

[22] Filed: Oct. 13, 1987

[51] Int. Cl.$^4$ .................. C01G 51/00; C22B 23/00
[52] U.S. Cl. ..................... 423/150; 423/139; 423/140; 423/592; 75/0.5 AN; 75/0.5 BA; 75/119; 75/101 R; 75/108; 75/DIG. 2; 75/DIG. 3
[58] Field of Search ............... 423/139, 140, 150, 592; 75/0.5 AA, 0.5 BA, 119, DIG. 3, DIG. 2, 108, 101 R

[56] References Cited

U.S. PATENT DOCUMENTS

| | | | |
|---|---|---|---|
| 2,400,098 | 5/1946 | Brogdon | 75/101 R |
| 3,130,043 | 4/1964 | Lichty | 75/101 R |
| 3,880,651 | 4/1975 | Queneau et al. | 75/101 R |
| 3,994,720 | 11/1976 | Dubeck | 75/101 R |
| 4,034,059 | 7/1977 | Clark et al. | 423/144 |
| 4,093,450 | 6/1978 | Doyle et al. | 75/0.5 BA |
| 4,151,258 | 4/1979 | Crnojevich et al. | 423/150 |
| 4,175,014 | 11/1979 | Crnojevich et al. | 75/119 |
| 4,184,868 | 1/1980 | Ritsko et al. | 423/143 |
| 4,214,894 | 7/1980 | Ritsko et al. | 75/0.5 AA |
| 4,214,895 | 7/1980 | Gingerich et al. | 423/143 |
| 4,214,896 | 7/1980 | Cheresnowsky | 423/143 |
| 4,218,240 | 8/1980 | Gingerich et al. | 423/143 |
| 4,233,063 | 11/1980 | Ritsko et al. | 423/143 |
| 4,244,938 | 1/1981 | Alkaitis | 423/592 |
| 4,278,463 | 7/1981 | Vanderpool et al. | 423/143 |
| 4,329,169 | 5/1982 | Gingerich et al. | 423/144 |
| 4,348,224 | 9/1982 | Gingerich et al. | 75/119 |
| 4,381,937 | 5/1983 | Gingerich et al. | 75/119 |
| 4,395,278 | 7/1983 | Vanderpool et al. | 75/0.5 AA |
| 4,409,019 | 10/1983 | Vanderpool et al. | 75/119 |
| 4,452,633 | 6/1984 | Miller et al. | 75/119 |
| 4,469,505 | 9/1984 | Cheresnowsky et al. | 75/119 |
| 4,545,814 | 10/1985 | Chou et al. | 75/0.5 A |

Primary Examiner—Robert L. Stoll
Assistant Examiner—Paige C. Harvey
Attorney, Agent, or Firm—Donald R. Castle; L. Rita Quatrini

[57] ABSTRACT

A method is disclosed for purifying cobaltic hydroxide of sodium and chloride which involves firing the cobaltic hydroxide at a temperature of from about 180° C. to about 850° C. to remove essentially all of the water and to release sodium from the crystal matrix of the cobaltic hydroxide, slurrying the dried cobaltic hydroxide in a deionized water solution which contains a sufficient amount of an ionic compound to prevent the peptization of the cobaltic hydroxide, to solubilize essentially all of the chloride and a greater portion of the sodium than would otherwise be solubilized without the firing step, and removing the purified cobaltic hydroxide from the resulting liquor.

5 Claims, No Drawings

METHOD FOR REMOVING SODIUM AND CHLORIDE FROM COBALTIC HYDROXIDE

This invention relates to a method for removing sodium and chloride impurities from cobaltic hydroxide by a method which increases the leachability of the sodium by firing the material first, followed by leaching out the sodium and chloride with a leaching medium which has ionic strength to prevent peptization of the cobaltic hydroxide.

BACKGROUND OF THE INVENTION

Cobalt containing material may be treated hydrometallurgically to produce a high purity cobaltic hydroxide. This hydroxide can be hydrogen reduced to a high purity extra fine metal powder for use in cemented carbide manufacture. Among the impurities present in the cobalt hydroxide are:

Sodium (Na—typically 100–200 pppm on a metal basis) and

Chloride (Cl—typically 15–100 ppm on a metal basis), although the levels of Na and Cl can be even higher than these values.

While these impurities are not deleterious in the manufacture of cemented carbides, they are unacceptable when the cobaltic hydroxide is used directly in nonmetallurgical applications.

Some reductions of the Na and Cl values can be obtained by reslurrying the cobaltic hydroxide in deionized water and then separating the cobaltic hydroxide from the wash solution by filtration. It is difficult to achieve levels of Na below 70 ppm (metal basis). Further washing in deionized water causes the hydroxide to peptize, making filtration difficult.

The following is art related to the processing of cobalt.

U.S. Pat. No. 4,184,868 relates to a method for producing extra fine cobalt metal powder by digesting cobalt pentammine chloride in ammonium hydroxide to obtain a black precipitate which contains cobalt and which is thereafter reduced to metal powder. U.S. Pat. Nos. 4,214,894, 4,233,063, and 4,278,463 relate to improvements in 4,184,868 in which the ammonia solutions are processed to recover any cobalt therein. U.S. Pat. Nos. 4,395,278 and 4,469,505 relate to improvements in U.S. Pat. No. 4,184,868 in which fine cobalt metal powder is produced having reduced tailings.

U.S. Pat. No. 4,214,895 relates to a process for producing cobalt metal powder which involves treating an aqueous solution of a soluble cobaltic ammine halide with a sufficient amount of a soluble metallic hydroxide to form a cobalt containing precipitate which is thereafter reduced to metallic cobalt.

U.S. Pat. No. 4,218,240 relates to a method for producing cobalt metal powder by forming a solution of a cobalt hexammine compound and treating the solution with a metallic hydroxide to form a precipitate which is reduced to cobalt metal powder. U.S. Pat. Nos. 4,348,224 and 4,381,937 relate to improvements in the process described in U.S. Pat. No. 4,218,240 which involve removal of copper and silver from the cobalt. U.S. Pat. Nos. 4,452,633 relates to an improvement in the processes described in U.S. Pat. Nos. 4,218,240 and 4,348,224 in which the silver is recovered.

U.S. Pat. No. 4,093,450 to Doyle et al describes a process for producing fine particle size cobalt metal powder by the hydrogen reduction of cobalt oxide obtained from a cobalt pentammine carbonate solution. The precipitate is formed by heating the solution to drive off ammonia and carbon dioxide to form a precipitate of cobalt oxide.

U.S. Pat. No. 4,329,169 relates to a process for producing fine cobalt metal powder absent tailings by heating an aqueous solution of soluble cobalt ammine halide to decompose the halide and form a cobalt containing precipitate which is reduced to the cobalt metal powder.

U.S. Pat. No. 4,409,019 relates to a process for producing fine cobalt metal powder from pieces of relatively pure cobalt by dissolving the cobalt pieces in an aqueous solution of hydrogen iodide and iodine and forming a cobalt containing solid which is subsequently reduced to a fine cobalt metal powder.

SUMMARY OF THE INVENTION

In accordance with one aspect of this invention, there is provided a method for purifying cobaltic hydroxide of sodium and chloride which involves firing the cobaltic hydroxide at a temperature of from about 180° C. to about 850° C. to remove essentially all of the water and to release sodium from the crystal matrix of the cobaltic hydroxide, slurrying the dried cobaltic hydroxide in a deionized water solution which contains a sufficient amount of an ionic compound to prevent the peptization of the cobaltic hydroxide, to solubilize essentially all of the chloride and a greater portion of the sodium than would otherwise be solubilized without the firing step, and removing the purified cobaltic hydroxide from the resulting liquor.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The cobaltic hydroxide which is the material which is to be purified of sodium and chloride can be from any source. However, typically it is derived from the processing of cobalt scrap by digesting the material in hydrochloric acid followed by adding ammonia to produce a cobalt hexammine solution. Hydrated cobalt oxide or cobaltic hydroxide is produced by adding sodium hydroxide to this solution. Details of this process are described in U.S. Pat. No. 4,218,240.

The sodium content of the cobaltic hydroxide is typically from 100 to 200 weight ppm on a cobalt metal basis, and the chloride content is from about 15 to about 100 weight ppm on a cobalt metal basis. However, the levels of Na and Cl can be higher than these values depending on the nature of prior processing.

The cobaltic hydroxide is heated or fired at a temperature of from about 180° C. to about 850 ° C. and preferably from about 200° C. to about 300° C. to remove all free and bound water and release sodium from the crystal matrix of the cobaltic hydroxide. Releasing sodium from the matrix allows the sodium to be more readily solubilized in the subsequent slurrying step resulting in the purification of the cobalt of sodium. The firing time depends on factors as temperature, size of the charge, design of the furnace, etc.

The resulting dried cobaltic hydroxide is then slurried in a deionized water solution containing a sufficient amount of an ionic compound to prevent the peptization of the cobaltic hydroxide. The sodium and chloride are dissolved into the solution and are therefore removed from the cobaltic hydroxide. The preferred ionic compounds are sodium chloride and ammonia. Ammonia is preferred because it does not add any contaminating metal ions to the system. The levels of ionic compound which have been found to work best are greater than about 0.05 molar with greater than about 0.05 molar to about 0.1 molar being preferred. The purpose of using an ionic compound is to impart sufficient ionic strength to the slurry medium to prevent peptization of the cobaltic hydroxide. Peptization makes the material very difficult to filter and the purification cannot be accomplished.

The resulting purified cobaltic hydroxide is then separated from the resulting liquor by standard techniques such as filtration.

If desired, the cobaltic hydroxide can be washed with deionized water usually while it is still on the filter to remove any residual liquor.

The method of the present invention results in a greater reduction of Na than would be accomplished if the firing step were not carried out. Usually, the sodium is reduced from a starting value of from about 100 to 200 weight ppm on a Co basis to <30 weight ppm on a Co basis. The chloride is essentially completely removed with chloride levels being reduced to typically <16 ppm metal basis in the cobaltic hydroxide.

To more fully illustrate this invention, the following nonlimiting example is presented. All parts, portions, and percentages are on a weight basis unless otherwise stated. Example Wet cobaltic hydroxide is dried for about 24 hours at about 288° C. About 13.6 parts of the dried material is added to a solution of about 1.1 parts of 30% by weight NH$_4$OH and about 198.8 parts of deionized water which is at a temperature of about 95° C. The resulting slurry is agitated for about 1 hour at 90–95° C., and then filtered. The filter cake is washed with about 100 parts of 90° C. deionized water.

Analyses of starting and purified cobaltic hydroxide are as follows:

| Element | Before treatment (ppm on a Co basis) | After treatment (ppm on a Co basis) |
| --- | --- | --- |
| Na | 87 | 27 |
| Cl | 24 | <16 |

The analyses show that the Na and Cl have been reduced significantly.

Similar materials containing about 130 and 87 weight ppm of Na on a cobalt metal basis are water washed without the firing step and without retarding peptization. The Na levels in the resulting washed cobaltic hydroxide are about 75 weight ppm on a cobalt metal basis. This shows that according to prior art methods, the Na is reduced only so far regardless of whether the starting material contains 130 or 87 ppm Na. The method of the present invention results in lower Na levels.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for removing sodium and chloride from impure cobaltic hydroxide, said method comprising:
   (a) firing said impure cobaltic hydroxide containing water, and the impurities of sodium and chloride at a temperature of from about 189° C. to about 850° C. to produce a dried cobaltic hydroxide;
   (b) slurrying said dried cobaltic hydroxide in deionized water which contains an ionic compound wherein the concentration of said ionic compound is greater than about 0.05 molar to produce a purified cobaltic hydroxide; and
   (c) removing said purified cobaltic hydroxide from the resulting liquor.

2. A method of claim 1 wherein the temperature is from about 200° C. to about 300° C.

3. A method of claim 1 wherein said ionic compound is selected from the group consisting of ammonia and sodium chloride.

4. A method of claim 1 wherein said ionic compound is ammonia.

5. A method of claim 1 wherein said concentration is greater than about 0.05 molar to about 0.1 molar.

* * * * *